(12) United States Patent
Lai

(10) Patent No.: US 10,283,012 B2
(45) Date of Patent: May 7, 2019

(54) BICOLOR NOTES AND CHARTS FOR EASY MUSIC NOTE READING

(71) Applicant: Erica H. Lai, Carmel, IN (US)

(72) Inventor: Erica H. Lai, Carmel, IN (US)

(*) Notice: Subject to any disclaimer, the term of this patent is extended or adjusted under 35 U.S.C. 154(b) by 2 days.

(21) Appl. No.: 15/949,035

(22) Filed: Apr. 9, 2018

(65) Prior Publication Data

US 2018/0308381 A1 Oct. 25, 2018

Related U.S. Application Data

(60) Provisional application No. 62/488,765, filed on Apr. 23, 2017.

(51) Int. Cl.
*G08B 15/02* (2006.01)
*G09B 15/02* (2006.01)

(52) U.S. Cl.
CPC ................... *G09B 15/026* (2013.01)

(58) Field of Classification Search
CPC .................................................. G09B 15/026
USPC ........................................................ 84/471 R
See application file for complete search history.

(56) References Cited

U.S. PATENT DOCUMENTS

| 1,526,547 A * | 2/1925 | Hughey | G09B 15/026 283/44 |
| 1,805,488 A * | 5/1931 | Myron | G09B 15/026 84/471 R |
| 3,430,530 A * | 3/1969 | Grindinger | G10G 1/00 84/471 R |
| 3,468,209 A * | 9/1969 | Barreto | G09B 15/06 84/376 K |
| 5,404,788 A * | 4/1995 | Frix | G10C 3/12 84/423 R |
| 7,323,629 B2 * | 1/2008 | Somani | G10H 1/0008 700/94 |
| 8,884,147 B1 * | 11/2014 | Stambaugh | G10H 1/38 84/609 |
| 10,013,961 B1 * | 7/2018 | Campbell | G10G 1/02 |
| 2002/0178896 A1 * | 12/2002 | George | G09B 15/026 84/477 R |
| 2015/0161905 A1 * | 6/2015 | Lippens | G09B 15/002 84/478 |

* cited by examiner

*Primary Examiner* — Jeffrey Donels

(57) ABSTRACT

The present invention relates generally to music notes for an easy note reading. In particular, the invention relates to make music note reading much easier, including piano notes.

3 Claims, 2 Drawing Sheets

BICOLOR NOTES AND CHARTS FOR EASY MUSIC NOTE READING

FIELD OF THE INVENTION

The present invention relates generally to music notes for an easy note reading. In particular, the invention relates to make music note reading much easier, including piano notes.

BACKGROUND

It is very challenging for beginners to read music notes on the charts easily.

Piano notes and charts are typically in black. Although color notes and charts have been created, but they have nothing to do with an easier way to read music notes.

Piano keyboard has two groups in one octave, based on the pattern of the black keys that have a pattern of two notes and three notes.

Therefore, splitting the 7 notes in one octave into 2 groups is easier for reading music notes. One group has notes C (or do/1), D (or re/2), and E (or mi/3). The other group has notes F (or fa/4), G (or so/5), A (or la/6), and B (or ti/7).

Also, splitting the 7 notes into 2 groups makes it is easier for a person to put his/her figures on the right positions on a keyboard.

Using two colors to indicate the notes in each group makes it easier to read the notes because memorizing a smaller group of notes (3 or 4) is easier than memorizing a greater group of notes (7).

SUMMARY

The present invention provides systems, methods, and apparatus for improving music note reading. The invention provides greater reliability and certainty to recognize music notes quickly, enabling beginners to play music notes much easier. Without intending to limit the scope of the invention in any way, and only by way of example, the systems, methods, and/or apparatus of the invention may be applied to piano notes and charts, etc.

It is an object of the present invention to provide an improved method for highlighting music notes and charts in two colors to enable easier music note reading.

It is an object of the present invention to provide an improved method for highlighting piano notes and charts in two colors to enable easier piano note reading.

In one aspect, a method and system of the present invention applies one color to highlight music notes C (or do/1), D (or re/2), and E (or mi/3) and their location lines and/or their location spaces on the music charts.

In another aspect, a method and/or system of the present invention further incorporates a second color to highlight music notes F (or fa/4), G (or so/5), A (or la/6), and B (or ti/7) and their location lines and/or their location spaces on the music charts.

The present invention is performed in two colors.

BRIEF DESCRIPTION OF THE DRAWINGS

The invention can be better understood with reference to the drawings and description. The components in some figures are not necessarily to scale, emphasis instead being placed upon illustrating certain principles and/or features of the invention.

DETAILED DESCRIPTION

Figure 1:
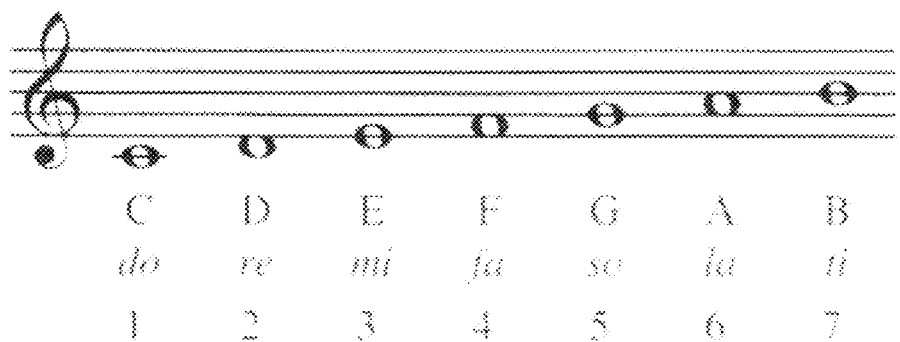
FIG. 1 depicts general note names in accordance with a method of the present invention.
Figure 2:
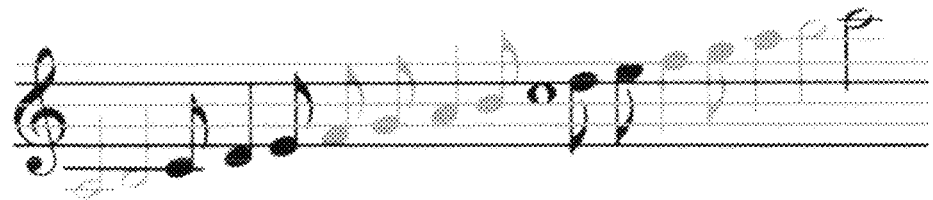
FIG. 2 depicts a more detailed treble clef in accordance with a preferred embodiment of the present invention showing application of 1) one color for highlighting music notes C (or do/1), D (or re/2), E (or mi/3), and their location lines on the music chart; and 2) the other color for highlighting music notes F (or fa/4), G (or so/5), A (or la/6), B (or ti/7) and their location lines on the music chart.
Figure 3:
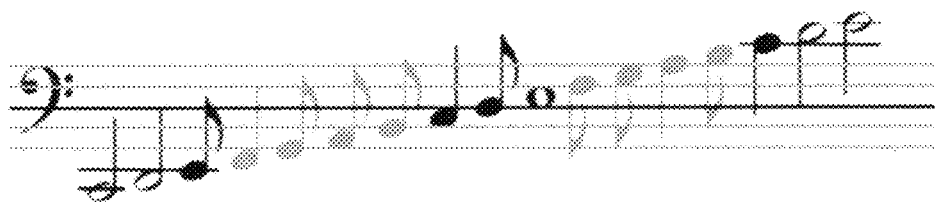
FIG. 3 depicts a more detailed bass clef in accordance with a preferred embodiment of the present invention showing application of 1) one color for highlighting music notes C (or do/1), D (or re/2), E (or mi/3), and their location lines on the music chart; and 2) the other color for highlighting music notes F (or fa/4), G (or so/5), A (or la/6), B (or ti/7) and their location lines on the music chart.
Figure 4:
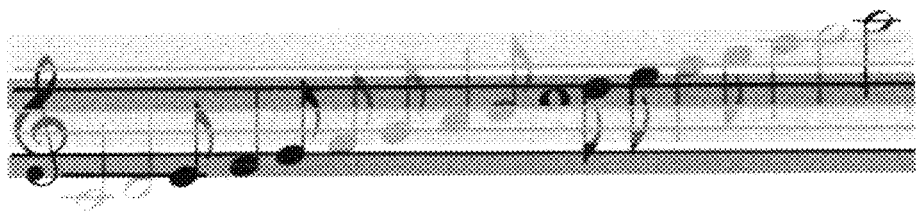
FIG. 4 depicts a more detailed treble clef in accordance with a preferred embodiment of the present invention showing application of 1) one color for highlighting music notes C (or do/1), D (or re/2), E (or mi/3), their location lines on the music chart, and their location spaces on the music chart; and 2) the other color for highlighting music notes F (or fa/4), G (or so/5), A (or la/6), B (or ti/7), their location lines on the music chart, and their location spaces on the music chart.
Figure 5:
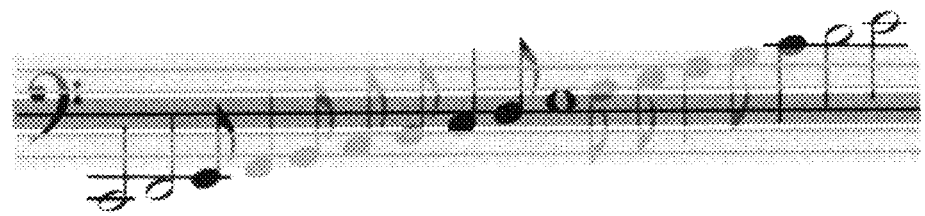
FIG. 5 depicts a more detailed bass clef in accordance with a preferred embodiment of the present invention showing application of 1) one color for highlighting music notes C (or do/1), D (or re/2), E (or mi/3), their location lines on the music chart, and their location spaces on the music chart; and 2) the other color for highlighting music notes F (or fa/4), G (or so/5), A (or la/6), B (or ti/7), their location lines on the music chart, and their location spaces on the music chart.

As used herein, the term "bicolor" refers to two colors. One color is for highlighting music notes C (or do/1), D (or re/2), E (or mi/3) and their location lines on the music charts. The other color is for highlighting music notes F (or fa/4), G (or so/5), A (or la/6), B (or ti/7) and their location lines on the music charts.

As used herein, the term "bicolor" refers to two colors. One color is for highlighting music notes C (or do/1), D (or re/2), E (or mi/3), their location lines, and their location spaces on the music charts. The other color is for highlighting music notes F (or fa/4), G (or so/5), A (or la/6), B (or ti/7), their location lines, and their location spaces on the music charts.

As used herein, the term "notes" refers to music notes named with C, D, E, F, G, A, and B.

As used herein, the term "notes" also refers to music notes named with do, re, mi, fa, so, la, and ti.

As used herein, the term "notes" also refers to music notes named with 1, 2, 3, 4, 5, 6, and 7.

As used herein, the term "notes" also refers to music notes named with a serial of names similar as mentioned above.

As used herein, the term "charts" refers to treble clef and bass clef.

What is claimed is:

1. A method of improving reading of musical notes and charts, comprising the steps of:
   a. Highlighting music notes C (or do/1), D (or re/2), E (or mi/3) and their location lines on music charts in one color on a treble clef and a bass clef of the music charts; and b. Highlight music notes F (or fa/4), G (or so/5), A (or la/6), B (or ti/7) and their location lines on music charts in another color on the treble clef and the bass clef.

2. A method of improving reading of notes and charts, comprising the steps of:
    a. Highlighting music notes C (or do/1), D (or re/2), E (or mi/3) their location lines, and their location spaces on music charts in one color on a treble clef and a bass clef of the music charts; and
    b. Highlight music notes F (or fa/4), G (or so/5), A (or la/6), B (or ti/7) their location lines, and their location spaces on music charts in another color on the treble clef and the bass clef.

3. The method of claim 1 or 2 wherein said one color and the other color are different colors.

* * * * *